Aug. 3, 1971  R. E. DOLLINGER  3,597,170

PELLETIZING OF CARBON BLACK DIRECTLY FROM SMOKE

Filed Sept. 9, 1968

INVENTOR.
R. E. DOLLINGER

BY

*Young & Quigg*
ATTORNEYS

United States Patent Office 3,597,170
Patented Aug. 3, 1971

3,597,170
PELLETIZING OF CARBON BLACK DIRECTLY FROM SMOKE
Robert E. Dollinger, Phillips, Tex., assignor to
Phillips Petroleum Company
Filed Sept. 9, 1968, Ser. No. 758,510
Int. Cl. B01j 2/12
U.S. Cl. 23—314                                10 Claims

ABSTRACT OF THE DISCLOSURE

A process for producing carbon black pellets in which the smoke from the reactor flows to the pelleter where it is quenched to form a carbon black composition suitable for pelleting, the gases being separated from the carbon black within the pelleter.

---

This invention relates to the production of carbon black.

In one of its more specific aspects, this invention relates to an improved process for the production of carbon black.

In the conventional furnace process for producing carbon black, carbon black smoke is quenched at the outlet from the furnace to terminate the reaction. Quenching is done by spraying water into the smoke to reduce its temperature; the smoke is then filtered and carbon black is separated from the gases. Thereafter, the black enters a pellet mill in which the black is pelleted and polished, and subsequently dried. It is conventional to add pelleting agents, usually aqueous solutions, to facilitate the formation of the pellets.

According to the method of this invention, there is provided a process for recovering carbon black which comprises quenching the reactant stream from the carbon black furnace with a liquid medium in a pelleting mill to reduce the temperature of the reactants below reaction temperature and to separate the carbon black from the smoke, pelleting the separated carbon black in the presence of the liquid medium, and recovering the pelleted black.

In one embodiment of this invention, some quenching is done prior to the entrance of the smoke into the pelleter.

In another embodiment of this invention, the smoke is introduced into the pelleter under conditions which facilitate the separation of the carbon black from the smoke.

In another embodiment of this invention, pelleting agents are introduced into the black during quenching.

According to this invention, there is also provided apparatus for producing carbon black which comprises a pelleting mill adapted with means for quenching the black and with means facilitating the separation of the carbon black from the smoke entering the pelleter therewith.

Accordingly, it is an object of this invention to provide an improved method for producing carbon black.

It is also an object of this invention to provide improved apparatus for the production of carbon black.

The method and apparatus of this invention will be more easily understood by referring to the attached drawing which schematically illustrates the invention.

Figure 1:
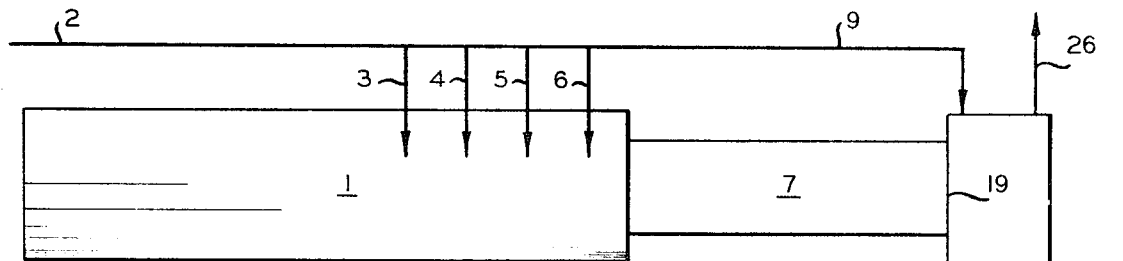

Referring to the drawing, there is shown in FIG. 1, in plan view, any conventional carbon black reactor 1, having the necessary reactant inlet lines, not shown, and in which carbon black is produced by the pyrolytic decomposition of any suitable hydrocarbon feedstock by any of the methods known in the art.

Reactor 1 is adapted with quench inlet line 2 and manifold lines 3, 4, 5 and 6 for introducing quench, usually water, into the downstream section of carbon black reactor 1 to terminate the reaction after it has proceeded to the desired extent.

Usually, the smoke will be reduced from a temperature of about 3,000° F. to about 600° F. The quantity of quench required depends upon the quality, quantity and temperature of the gases, and is easily determined in each instance.

The cooled gases, usually comprising carbon dioxide, carbon monoxide, nitrogen, hydrogen, water vapor and residual traces of hydrocarbon, are then conducted into pelleter 8 through conduit 7. Quenching of the smoke can be conducted at any point between reactor 1 and pelleter 8 in order to reduce the smoke to the desired temperature at the inlet to the pelleter.

Conduit 7 dicharges into pelleter 8 through entry 19 in a manner conducive to the cyclonic separation of the carbon black from the gases. Entry into the pelleter will preferably be tangential to the longitudinal axis of the pelleter with the velocity of the entering smoke being maintained at about 50 to about 200 feet per second, preferably at about 100 to about 150 feet per second. A cooling medium, preferably an aqueous liquid, will simultaneously be introduced into contact with the smoke stream through conduit 9 to facilitate separation of the particulate black from the gases and to form a carbon black-liquid mixture suitable for pelleting.

The pelleting of the black is conventional within the art. The quench introduced through conduit 9 will most frequently be water containing a pelleting agent. The amount of quench will be sufficient to reduce the carbon black to that temperature at which at least a portion of the quench will remain in the black as liquid. The manner of quenching need only insure adequate contact between quench and smoke.

Figure 2:
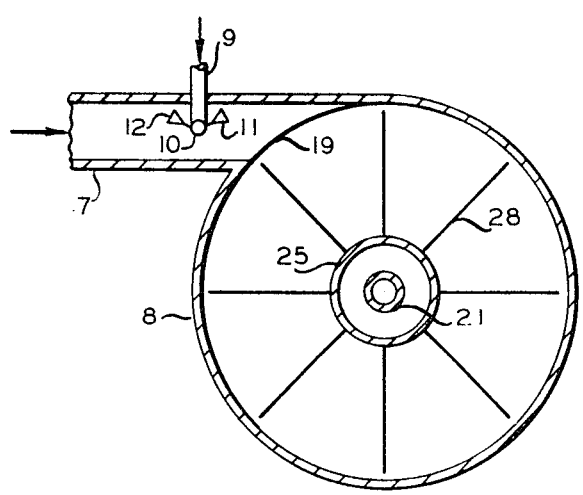

Referring now to FIG. 2 there is shown in elevation a cross-sectional view of pelleter 8. Conduit 7 enters tangentially through entry 19. Quench conduit 9, connected to manifold 10, is equipped with a plurality of spray nozzles, 11 and 12, arranged to discharge the quench into the smoke to cool it to about the vaporization temperature of water and to produce a mixture of carbon black and quench for pelleting. Sufficient quench is employed to produce a carbon black-quench mixture containing quench to the extent of about 30 percent to about 70 percent by weight, preferably about 40 percent to about 60 percent by weight.

The pelleter is shown positioned horizontally. It may be positioned either horizontally or vertically, or at any intermediate position. Generally, it will be inclined with the discharge end about 30° below the horizontal to facilitate gravitational passage of the carbon black therethrough.

The pelleter, in certain of its aspects, will be conventional within the industry; it will have an axially-positioned rotating shaft equipped with circumferentially-located pins adapted to pellet the black and polish the pellets. A pelleter particularly suited for the process will possess other features as shown in FIG. 3 of the attached drawing.

Figure 3:
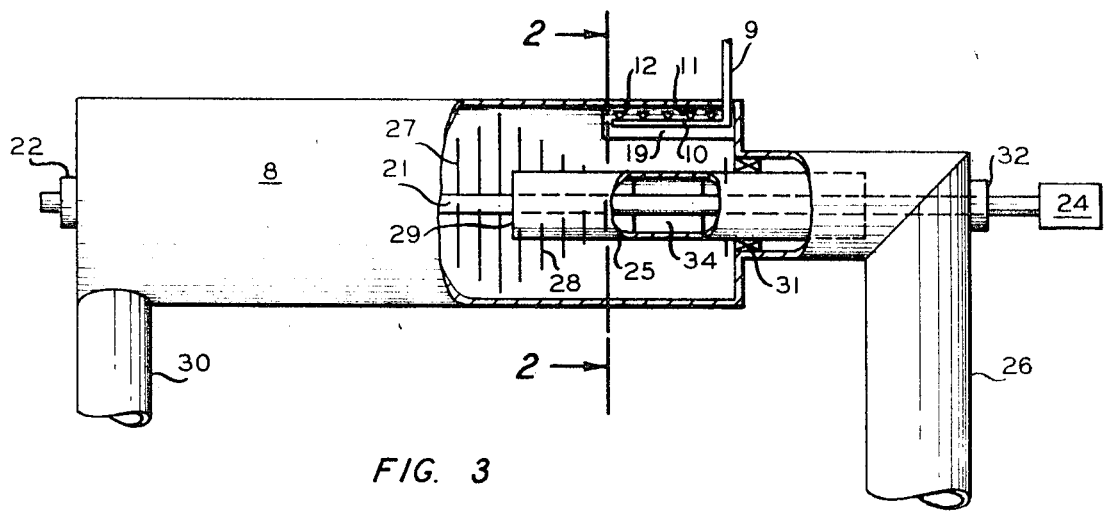

In FIG. 3, there is shown an elevation view of pelleter 8 including conduit 9 and manifold 10, spray nozzles 11 and 12, and entry 19 previously described.

Pelleter 8 is equipped with shaft 21 carrying pins 27, shaft 21 being supplied with conventional packing glands and bushings 22 and 32, and being driven at its drive end by suitable drive 24.

Hollow shaft 25, carrying pins 28, is maintained by suitable means in spaced relationship from shaft 21, for example, by a multiplicity of spider arrangements internal of shaft 25, the spaced relationship forming an annulus 34 between the shafts, annulus 34 having entrance 29 at its one end. Annulus 34 provides a passageway which extends from entrance 29 through a sealed packing arrangement 31 to the drive end of the pelleter and connects with outlet conduit 26, hence forming an outlet for the gases from the pelleter.

In operation, the smoke enters through conduit 7 and entry 19 and is quenched. A mixture of carbon black and quench is formed. This mixture passes along the lower segment of the pelleter, being pelleted and polished, the pellets leaving the pelleter through outlet 30.

The gases, substantially free of black, pass into annulus 34 through entry 29, and flow within annulus 34 and from the pelleter through conduit 26.

Certain optional modifications of the above equipment will be evident. For example, an exhaust fan can be interconnected to conduit 26 to facilitate the removal of the gases from the pelleter. This fan can, in turn, be regulated by a device which senses the pressure within the pelleter and governs the speed of the fan, or opens a valve in the suction line, to regulate pressure within the pelleter. By such methods, the amount of gas leaving the pelleter with the pellets through outlet 30 will be minimized. Alternately, a slight vacuum can be held at outlet 30 so that gas flow is into outlet 30 and into annulus 34, thus minimizing outward gas flow and disturbance of the carbon black pellets in the vicinity of outlet 30.

EXAMPLE

In accordance with the method of this invention and employing the apparatus of this invention, carbon black was produced in a conventional furnace from a hydrocarbon feedstock, smoke being produced at 2750° F.

The smoke was quenched with water to 600° F. at which point the 600,000 actual cubic feet of wet smoke contained 50 volume percent water, and 900 pounds of black. This smoke was conducted into a pelleter, operated at 15 p.s.i.a., and having an internal diameter of about 3 feet. Entrance to the pelleter was made tangentially at a velocity of about 100 feet per second, 60° F. water containing a small quantity of molasses being used to quench the smoke at the entrance. About 3100 pounds per hour of water were added and reduced the black temperature of about 213° F., the 900 pounds of wet black retaining about 900 pounds of water at about 213° F.

The wet gas leaving the pelleter amounted to about 440,000 cubic feet per hour and passed through the pelleter at about 25 feet per second and through the 1½ foot diameter annulus between the shafts at a velocity of about 60 feet per second.

Pellets were formed and polished and passed from the pelleter to a dried.

It will be evident that various modifications can be made to the method and apparatus of this invention, such modifications being within the skill of the art.

I claim:

1. A process for recovering carbon black from the smoke produced by the pyrolytic decomposition of hydrocarbons which comprises introducting smoke into a pelleter, quenching said smoke to produce a mixture of carbon black and quench within the pelleter, separating said mixture from gases and pelleting the carbon black.

2. The process defined in claim 1 in which the smoke is quenched prior to its introduction into the pelleter.

3. The process defined in claim 1 in which the smoke is introduced into the pelleter tangentially to the longitudinal axis of the pelleter at a velocity of from about 50 to about 200 feet per second.

4. The process defined in claim 3 in which the smoke is quenched simultaneous with its introduction into the pelleter.

5. The process defined in claim 1 in which the smoke is quenched to produce a mixture of carbon black containing about 30 to about 70 percent quench by weight.

6. The process defined in claim 1 in which said smoke is introduced through the circumferential periphery of said pelleter at a velocity sufficient to cyclonically separate carbon black from said smoke.

7. The process as defined in claim 4 in which said smoke is introduced into said pelleter at a velocity of about 100 feet per second to produce a mixture comprising substantially equal quantities of carbon black on quench by weight, and said quench comprises an aqueous solution of molasses.

8. A carbon black pelleter which comprises a casing having an inlet and an outlet, a rotatably mounted shaft axially positioned within said casing, said shaft being equipped with pelleting pins, said shaft comprising an inner member and an outer member in spaced relationship to form an annulus therebetween, said annulus being adapted for passage of vapors therethrough from the interior of said casing to its exterior.

9. The apparatus defined in claim 8 in which said inlet to said casing is positioned tangentially with respect to the axially positioned shaft.

10. The apparatus defined in claim 8 in which said casing inlet is adapted with quenching means.

References Cited

UNITED STATES PATENTS

| 2,890,942 | 6/1959 | Webster et al. | 23—314 |
| 3,034,421 | 5/1962 | Pence | 23—314UX |
| 3,307,911 | 3/1967 | Krejci | 23—209.4 |
| 3,326,642 | 6/1967 | Ruble | 23—314 |
| 3,333,038 | 7/1967 | Walenciak | 264—117 |
| 3,340,080 | 9/1967 | Henderson | 23—209.4X |

NORMAN YUDKOFF, Primary Examiner

D. EDWARDS, Assistant Examiner

U.S. Cl. X.R.

18—1; 23—209.4, 209.9; 34—181; 55—84; 261—79; 264—117